United States Patent [19]

Coelho

[11] Patent Number: 5,544,251

[45] Date of Patent: Aug. 6, 1996

[54] PROCESS AND APPARATUS FOR PSEUDO-SIMD PROCESSING OF IMAGE DATA

[75] Inventor: Rohan Coelho, Hillsboro, Oreg.

[73] Assignee: Intel Corporation, Santa Clara, Calif.

[21] Appl. No.: 243,291

[22] Filed: May 17, 1994

Related U.S. Application Data

[63] Continuation-in-part of Ser. No. 182,758, Jan. 14, 1994, abandoned.

[51] Int. Cl.⁶ ......................................... G06K 9/36
[52] U.S. Cl. .......................... 382/232; 382/276; 348/413; 348/415
[58] Field of Search .................... 382/41, 56, 132, 382/276, 232; 348/415, 419, 409, 16, 400, 413, 416; 364/725, 245, 514; 395/425; 371/31; 375/34; 455/222; 358/136; 325/38 B; 367/76; 84/503

[56] References Cited

U.S. PATENT DOCUMENTS

| | | | |
|---|---|---|---|
| 3,839,675 | 10/1974 | Wernikoff et al. | 325/38 B |
| 4,371,895 | 2/1983 | Koga | 348/413 |
| 4,454,546 | 6/1984 | Mori | 382/56 |
| 4,488,174 | 12/1984 | Mitchell et al. | 358/136 |
| 4,488,175 | 12/1984 | Netravali | 358/136 |
| 4,509,150 | 4/1985 | Davis | 367/76 |
| 4,636,856 | 1/1987 | Starck | 348/409 |
| 4,916,996 | 4/1990 | Suzuki et al. | 84/603 |
| 4,918,633 | 4/1990 | Sullivan | 364/574 |
| 4,972,260 | 11/1990 | Fujikawa et al. | 358/136 |
| 5,198,898 | 3/1993 | Miyata | 382/56 |
| 5,260,783 | 11/1993 | Dixit | 348/415 |
| 5,317,522 | 5/1994 | Bonet et al. | 364/514 |
| 5,369,572 | 11/1994 | Haraki et al. | 382/132 |
| 5,369,791 | 11/1994 | Asghar et al. | 455/222 |
| 5,408,269 | 4/1995 | Tsukagoshi | 348/416 |

Primary Examiner—Jose L. Couso
Assistant Examiner—Anh Hong Do
Attorney, Agent, or Firm—William H. Murray; N. Stephan Kinsella

[57] ABSTRACT

In a system for forming a decompressed digital video signal representative of a digital video image, first and second pixel signals respectively corresponding to first and second pixels are provided, and first and second quantized pixel difference value signals respectively representing first and second quantized pixel difference values are provided. First and second values corresponding to the first and second pixel signals are loaded into a first register of a non-parallel processor, and third and fourth values corresponding to the first and second quantized pixel difference signals are loaded into a second register of the non-parallel processor. First and second current pixel values are concurrently generated by adding the contents of the first and second registers in a single operation, wherein the quantized pixel difference values have been predetermined to ensure that the additive result of the first and third values does not spillover into the additive result of the second and fourth values. A decompressed digital video signal is generated in accordance with the first and second current pixel values.

9 Claims, 2 Drawing Sheets

5,544,251

PROCESS AND APPARATUS FOR PSEUDO-SIMD PROCESSING OF IMAGE DATA

CROSS-REFERENCE TO RELATED APPLICATION

The present application is a continuation-in-part of U.S. patent application Ser. No. 08/182,758, filed Jan. 14, 1994, now abandoned, the contents of which are hereby incorporated herein in their entirety by reference.

FIELD OF THE INVENTION

The present invention relates to image processing, and, in particular, to processes and apparatuses for processing image data using non-parallel processors. The present invention further relates to systems for providing compressed digital video signals representative of full color motion video images.

BACKGROUND OF THE INVENTION

It is desirable to perform image processing using conventional non-parallel processors. It is particularly desirable to process digital video images in real time using such processors. One of the problems associated with such processing is that conventional non-parallel processors have processing bandwidth limitations that often preclude the real-time implementation of many conventional image processing techniques for digital video images of desired sizes and resolutions.

When digital images are processed using non-parallel processors, it is conventional to process the image pixel data serially, i.e., by repeating the application of each mathematical operation to each pixel value of each row of the image independently.

For example, in the known video compression technique of vector quantization, all or part of a frame of video data is encoded based upon the differences between corresponding pixels in the previous frame and the current frame of data. When vector dequantization is performed to decode an image that was compressed using vector quantization, each pixel value $c_i$ of the current frame is generated by adding a corresponding difference value $d_i$ to the corresponding pixel value $p_i$ of the previously decoded frame. In conventional non-parallel processing, this is done by applying the addition operation once for each pixel independently, for example, in a loop that is repeated for each pixel of each row of each frame of video data.

Because of the processing bandwidth limitations of conventional non-parallel processors, conventional image processing techniques (such as vector dequantization) cannot be performed in real time on images of certain sizes and resolutions due to the volume of data to be processed.

What are needed are improvements in conventional image processing techniques for processing images of desired sizes and resolutions that meet the processing bandwidth limitations of conventional non-parallel processors and thereby provide real-time processing capabilities.

It is accordingly an object of this invention to overcome the disadvantages and drawbacks of the known art and to provide digital image processing techniques that improve the capability of conventional non-parallel processors to process images of desired sizes and resolutions in real time.

It is a particular object of this invention to provide an image processing system with improved capabilities for performing vector dequantization of encoded video images in real time.

Further objects and advantages of this invention will become apparent from the detailed description of a preferred embodiment which follows.

SUMMARY OF THE INVENTION

A preferred embodiment of the present invention is directed to a system for forming a compressed digital video signal representative of a digital video image wherein first and second pixel signals respectively corresponding to first and second pixels are provided, and a pixel difference value representing a difference between the first and second pixels is determined. A quantized pixel difference value signal representative of a quantized difference value is generated in response to the first and second pixel signals, wherein the absolute value of the quantized difference value is always less than or equal to the absolute value of the difference value. A compressed digital video signal is formed in response to the quantized difference value signal.

A further preferred embodiment of the present invention is directed to a system for forming a decompressed digital video signal representative of digital video image, wherein first and second pixel signals respectively corresponding to first and second pixels are provided, and first and second quantized pixel difference value signals respectively representing first and second quantized pixel difference values are provided. First and second values corresponding to the first and second pixel signals are loaded into a first register of a non-parallel processor, and third and fourth values corresponding to the first and second quantized pixel difference signals are loaded into a second register of the non-parallel processor. First and second current pixel values are concurrently generated by adding the contents of the first and second registers in a single operation, wherein the quantized pixel difference values have been predetermined to ensure that the additive result of the first and third values does not spillover into the additive result of the second and fourth values. A decompressed digital video signal is generated in accordance with the first and second current pixel values.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S).

The present invention is directed to processes and apparatuses for processing pixel images using non-parallel processors that implement image processing techniques that simulate processing on parallel processors. According to this invention, at least two values corresponding to at least two different pixels of an image are loaded into a register of a non-parallel processor. An operation is then performed on the register, whereby the operation is effectively applied to the register values in parallel, thereby providing pseudo-parallel processing on a non-parallel processor. Such processing is referred to as pseudo-SIMD, where SIMD stands for "single-instruction, multiple-data"—a type of parallel processing in which a single operation is concurrently applied to multiple data values.

Figure 1:
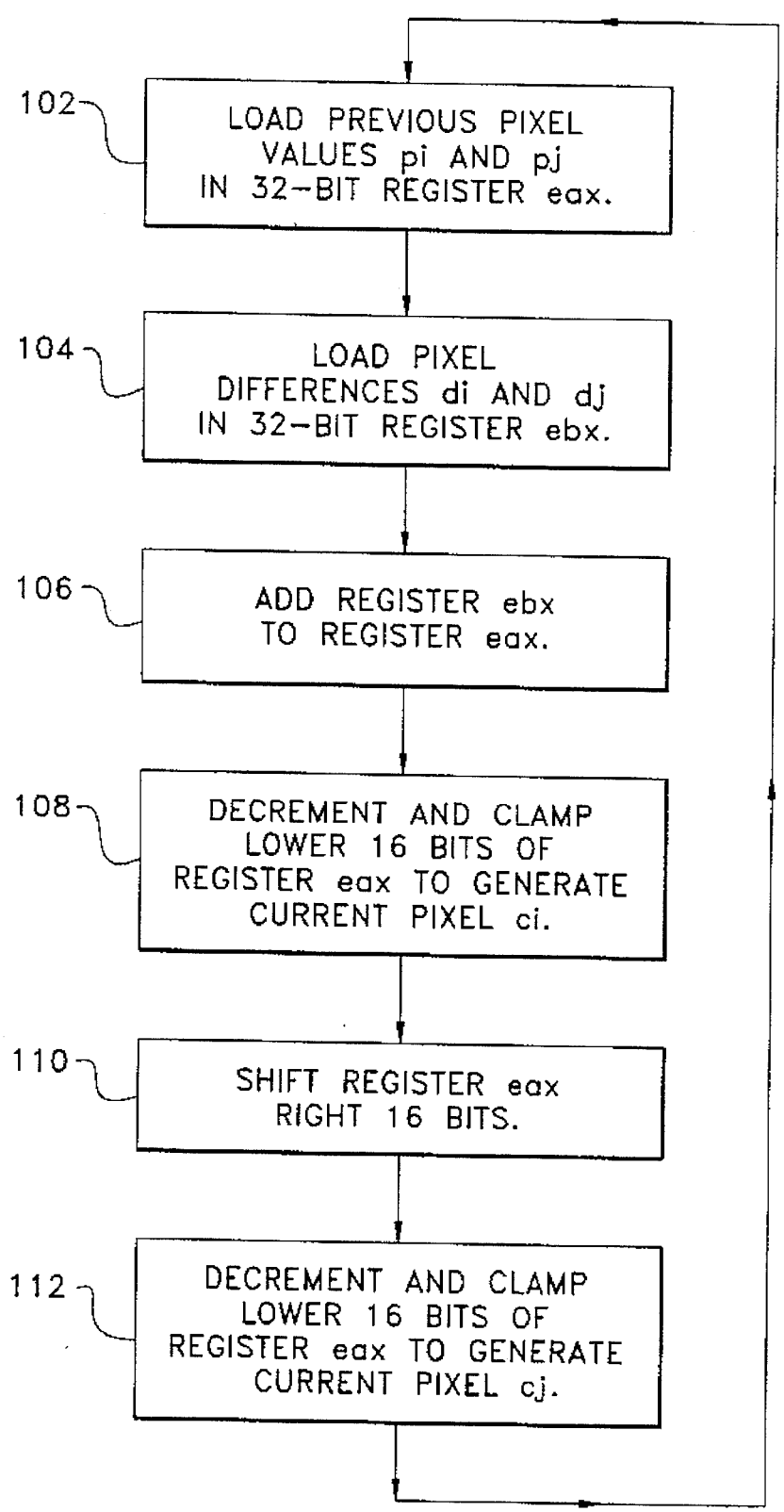
FIG. 1 is a process flow diagram of the processing implemented by a vector dequantization system, according to a preferred embodiment of the present invention.

Referring now to FIG. 1, there is shown a process flow diagram of the processing implemented by vector dequantization system 100, according to a preferred embodiment of the present invention. System 100 is preferably implemented on a non-parallel 32-bit processor, such as an Intel® 286, 386, 486, or Pentium® processor.

An Intel® 286, 386, 486, or Pentium® processor has 32-bit registers, such as registers eax and ebx. Register eax contains four 8-bit fields. The lowest and second lowest 8-bit fields may be directly and independently addressed as al and ah, respectively. In addition, fields al and ah may be addressed directly and collectively as the 16-bit field ax. To load data into the two highest 8-bit fields, the data are loaded into field ax and shifted left. Similarly, to access data stored in the two highest 8-bit fields, the data are first shifted right and then accessed directly from field ax. All 32 bits of register eax may also be loaded at one time with a DWORD read instruction. Register ebx has an analogous 16-bit field bx, which comprises 8-bit fields bl and bh.

System 100 implements vector dequantization processing to decode encoded video images in a pseudo-SIMD fashion. In vector dequantization processing, the pixel values of a current image are generated by adding pixel differences associated with the current image to the corresponding pixel values of a previous image. The current and previous images may for example represent consecutive images within a sequence of digital motion video images.

System 100 accomplishes pseudo-SIMD vector dequantization processing by (1) loading two 8-bit pixel values corresponding to two pixels of the previous frame into 32-bit register eax, (2) loading two 8-bit pixel differences corresponding to the same two pixels of the current frame into 32-bit register ebx, and then (3) applying the addition operation to the loaded registers, where the data loaded in the registers are treated like single 32-bit values, to generate values corresponding to the two pixels of the current frame.

More particularly, means 102 of system 100 loads 8-bit unsigned pixel values $p_i$ and $p_j$ into 32-bit register eax. Pixel values $p_i$ and $p_j$ are preferably components (e.g., Y, U, or V) of two adjacent pixels of the previous frame of video data. Means 102 preferably (1) loads pixel value $p_j$ into field al of register eax, (2) shifts register eax left 16 bits, and (3) loads pixel value $p_i$ into field al. As such, means 102 loads pixel value $p_i$ into field al and pixel value $p_j$ into the second highest field of register eax, while the bits of field ah and the highest field of register eax are preferably set to zero.

Pixel differences d are preferably 8-bit unsigned values that represent the values from −128 to +127. For example, the unsigned pixel difference d of (0000 0000) corresponds to the value −128, while the unsigned pixel difference d of (1111 1111) corresponds to the value +127. In one preferred embodiment, means 104 uses processing analogous to means 102 to load pixel differences $d_i$ and $d_j$ corresponding to the current video frame into 32-bit register ebx. In an alternative preferred embodiment, pairs of 8-bit pixel differences are stored in tables as 32-bit values that are designed to be loaded by means 104 into register ebx using a single DWORD read instruction.

Means 106 then performs an addition operation on registers eax and ebx to add the contents of register ebx to the contents of register eax.

Those skilled in the art will understand that the addition of an 8-bit unsigned pixel difference d to an 8-bit unsigned pixel value p may result in an overflow into the 9th bit (i.e., the least significant bit (LSB) of the next higher 8-bit field of the 32-bit register). Such an overflow will occur if the resulting unsigned sum has a value greater than 255.

To handle this overflow condition and to adjust for the fact that the pixel differences d are represented by unsigned values, means 108 subtracts 128 from the value in field ax and then clamps the result to be between 0 and 255 to generate the pixel value $c_i$ for the current frame. Means 110 then shifts register eax right 16 bits and means 112 subtracts 128 from the shifted value in field ax and clamps the result to be between 0 and 255 to generate the pixel value $c_j$ for the current frame. In a preferred embodiment, the subtraction and clamping of means 108 and 110 are implemented by a lookup to a table that maps undecremented, unclamped values to the corresponding decremented, clamped values.

The processing of means 102–112 is preferably repeated for each pair of pixel values in each row of each component frame of the current frame of video data to complete the vector dequantization for the current frame. The decoded current image frame may then be displayed on a display monitor.

Figure 2:
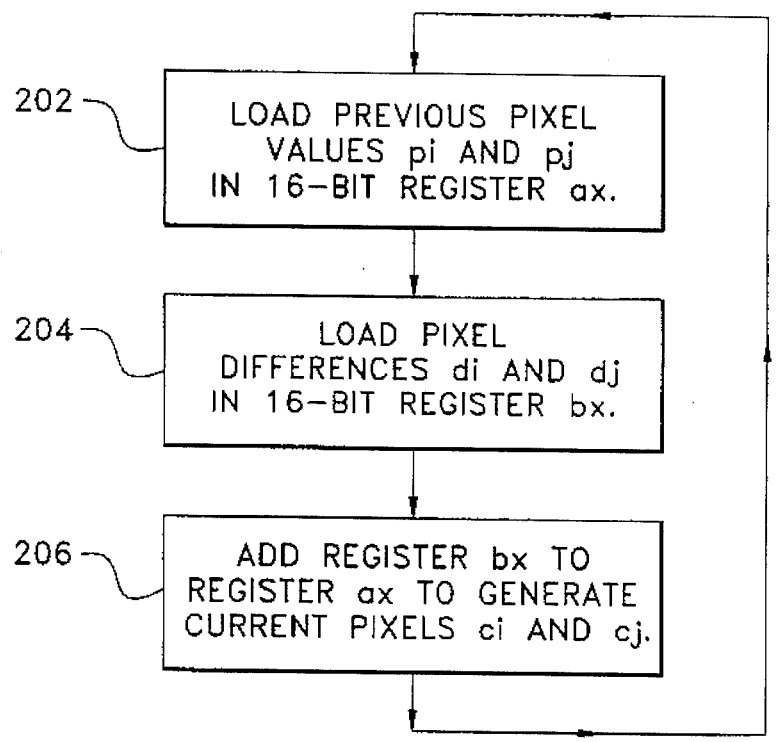
FIG. 2 is a process flow diagram of the processing implemented by a vector dequantization system, according to an alternative preferred embodiment of the present invention.

Referring now to FIG. 2, there is shown a process flow diagram of the processing implemented by vector dequantization system 200, according to an alternative preferred embodiment of the present invention. System 200 is preferably implemented on a non-parallel 32-bit processor such as an Intel® 386, 486, or Pentium® microprocessor. Those skilled in the art will understand that system 200 may also be implemented on other processors such as a 16-bit processor.

In the preferred embodiment in which system 200 is implemented on a 32-bit processor, system 200 may process up to four 8-bit pixels at a time in a pseudo-SIMD fashion. For purposes of explanation in this specification, however, system 200 is described in terms of processing two pixels at a time in a pseudo-SIMD fashion using 16-bit registers ax and bx. Register ax contains 8-bit low field al and 8-bit high field ah. Each of register ax and fields al and ah may be addressed directly. Register bx has analogous 8-bit fields bl and bh. Those skilled in the art will understand that the principles of the described two-pixel, 16-bit implementation may be applied to the preferred four-pixel, 32-bit implementation.

Like system 100, system 200 implements vector dequantization processing to decode encoded video images in a pseudo-SIMD fashion. System 200 accomplishes this pseudo-SIMD vector dequantization processing by (1) loading two 8-bit pixel values corresponding to two pixels of the previous frame into 16-bit register ax, (2) loading a 16-bit value corresponding to two 8-bit pixel differences associated with the corresponding two pixels of the current frame into 16-bit register bx, and then (3) applying an addition operation to the loaded registers, where the data loaded in the registers are treated like single 16-bit values, to generate values corresponding to the two pixels of the current frame.

More particularly, means 202 of system 200 loads 8-bit unsigned pixel values $p_i$ and $p_j$ into 16-bit register ax. Pixel values $p_i$ and $p_j$ are preferably components (e.g., Y, U, or V) of two pixels of the previous frame of video data. Means 202 preferably (1) loads pixel value $p_j$ directly into field ah of register ax and (2) loads pixel value $p_i$ directly into field al.

Means 204 loads values corresponding to pixel differences $d_i$ and $d_j$ for the current video frame into fields bl and bh of 16-bit register bx, respectively. In a preferred embodiment, means 204 retrieves these difference values as a single 16-bit value stored in a dequantization table.

Means 206 then performs an addition operation on registers ax and bx to add the contents of register bx to the contents of register ax. The resulting 8-bit values in fields al and ah of register ax are the pixel values $c_i$ and $c_j$ for the current frame, respectively.

The processing of means 202–206 is preferably repeated for each pair of pixel values in each row of each component frame of the current frame of video data to complete the vector dequantization for the current frame. The decoded current image frame may then be displayed on a display monitor.

In system 200, pixel values p are preferably represented as 8-bit unsigned values (i.e., from 0 to 255) and pixel differences d are preferably represented as 8-bit signed (i.e., twos-complement) values (i.e., from −128 to +127). System 200 is designed to ensure that, when an 8-bit unsigned pixel value p is added to an 8-bit signed pixel difference d, the resulting 8 least significant bits (LSBs) correspond to the correct 8-bit unsigned pixel value c. This requires the vector quantization (or compression) system used in conjunction with system 200 to anticipate certain circumstances during the image compression process so as to prevent erroneous results during the operation of system 200.

For example, if the unsigned value p is greater than 127 and the signed difference d is positive, then the resulting unsigned sum of these values could potentially be greater than 255. If the resulting sum were greater than 255, then there would be a spillover into the 9th bit and the resulting 8 LSBs would not correspond to the correct 8-bit unsigned pixel value c. For example, if p was 255 or (1111 1111) and d was +1 or (0000 0001), the additive result would be 256 or (1 0000 0000). System 200 relies upon preferred vector quantization processing to generate encoded data that avoids the overflow problem due to a resulting unsigned sum having a value greater than 255. This preferred vector quantization processing system 300 (described below in connection with FIG. 3) ensures that vector dequantization system 200 will not generate unsigned sums greater than 255.

Similarly, if the unsigned value p is less than 128 and the signed difference d is negative, then the resulting unsigned sum could potentially be less than 0. If the resulting sum was less than 0, then the resulting 8 LSBs would not correspond to the correct 8-bit unsigned pixel value c. For example, if p was 1 or (0000 0001) and d was −2 or (1111 1110), the resulting 8 LSBs would be (1111 1111), which corresponds to an unsigned value of 255. System 200 relies upon preferred vector quantization processing to generate encoded data that avoids an underflow where a resulting sum has a value less than 0. More particularly, this preferred vector quantization system 300 (described below in connection with FIG. 3) ensures that vector dequantization system 200 will not generate sums less than 0.

Figure 3:
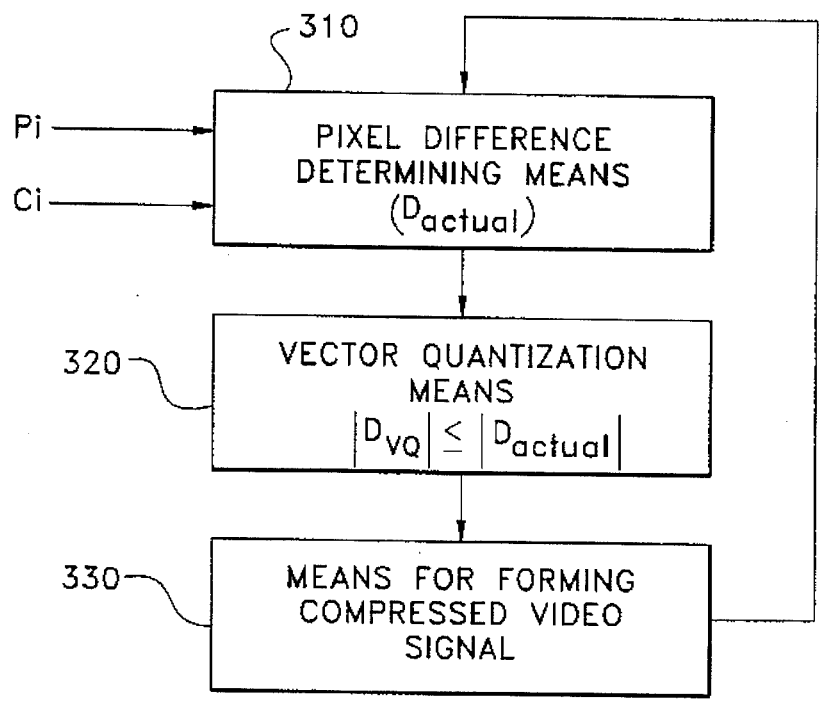
FIG. 3 is a process flow diagram of the processing implemented by a vector quantization system, according to a preferred embodiment of the present invention.

As explained above, when system 200 relies upon the preferred vector quantization system 300 shown in FIG. 3 to prevent sums greater than 255 and less than 0 during vector dequantization, the resulting 8 LSBs will always correspond to the correct 8-bit unsigned sum. However, when the signed difference d is less than 0, there will still be a spillover into the 9th bit. For example, when p is +2 or (0000 0010) and d is −1 or (1111 1111), the resulting sum is (1 0000 0001). The resulting 8 LSBs correctly correspond to the 8-bit unsigned value for +1, but there is a spillover to the 9th bit. Under other circumstances this spillover may be ignored, but, in system 200, the 9th bit may correspond to the LSB of the dequantization sum for the adjacent pixel and the spillover may corrupt the dequantization processing for that pixel.

For example, assume that previous pixels $p_i$ and $p_j$ are 10 (i.e., 0000 1010) and 12 (i.e., 0000 1100), respectively, and that corresponding current pixels $c_i$ and $c_j$ are 8 and 10, respectively. During vector quantization processing, current pixels $c_i$ and $c_j$ may both be encoded based on pixel differences $d_i$ and $d_j$ of −2 (i.e., 1111 1110).

In this example, during dequantization, means 202 of system 200 loads the previous pixels $p_i$ and $p_j$ into 16-bit register ax as the single value:

(0000 1010 0000 1100).

If means 204 were to load the pixel differences $d_i$ and $d_j$ into 16-bit register bx as the single value:

(1111 1110 1111 1110), then means 206 would add register bx to register ax to generate the 16-bit value:

(0000 1001 0000 1010), which corresponds to current 8-bit pixel values $c_i$ and $c_j$ of 9 and 10, respectively. In this case, current pixel $c_i$ would be miscalculated as 9 instead of 8 because of the spillover from the calculation for current pixel $c_j$.

In order to avoid this problem, whenever pixel difference $d_j$ is negative, the value used for pixel difference $d_i$ during decompression processing is one less than the value of the quantized pixel difference $d_i$ determined during quantization processing. Thus, for the current example, means 204 preferably loads register bx with the 16-bit value:

(1111 1101 1111 1110), which corresponds to 8-bit differences of −3 and −2, respectively. Then, when means 206 adds register bx to register ax, the resulting 16-bit sum will be the value:

(0000 1000 0000 1010), which corresponds to the correct current 8-bit pixel values $c_i$ and $c_j$ of 8 and 10, respectively.

In a preferred embodiment, the pixel differences $d_i$ and $d_j$ are stored as 16-bit values in a dequantization table. The dequantization table is generated off line to contain values that take into account the spillover into the 9th bit when $d_j$ is negative. That is, whenever difference $d_j$ is negative, the value stored in the upper 8 bits of the 16-bit entry in the dequantization table is one less than the actual value for difference $d_i$. In that preferred embodiment, means 204 loads register bx using a table lookup to the dequantization table.

Although, for purposes of explanation in this specification, system 200 has been described in terms of processing two pixels at a time in a pseudo-SIMD fashion using 16-bit registers ax and bx, it will be understood by those skilled in the art that system 200 may implemented on a 32-bit processor to process up to four 8-bit pixels at a time in a pseudo-SIMD fashion. Similarly, it will be understood by those skilled in the art that system 200 may implemented on a 64-bit processor to process up to eight 8-bit pixels at a time in a pseudo-SIMD fashion, or upon even wider processors (i.e., wider than 64 bits) to process more than eight 8-bit pixels at a time in a pseudo-SIMD fashion.

Those skilled in the art will also understand that the present invention may be used to implement pseudo-SIMD processing techniques on conventional non-parallel processors, other than the vector dequantization implemented by systems 100 and 200. In other words, operations other than addition may be applied in a pseudo-SIMD fashion to two or more pixels stored in a single register.

Referring now to FIG. 3, there is shown a process flow diagram of the processing implemented by vector quantization system 300, according to a preferred embodiment of the present invention. System 300 is preferably implemented on a non-parallel 32-bit processor such as an Intel® 386, 486, or Pentium® microprocessor. Those skilled in the art will understand that system 300 may also be implemented on other processors such as a 16-bit processor.

System 300 generates encoded (or compressed) digital video signals by applying vector quantization processing to pixel images that are within a sequence of digital video images. In the preferred embodiment, system 300 generates a vector quantized value for each pixel ($c_i$) in a current image based on the difference between that pixel and a corresponding pixel ($p_i$) in a previous image. System 300 includes a pixel difference determining means 310 which accepts as its inputs a first pixel signal corresponding to the value of $c_i$ and a second pixel signal corresponding to the value of $p_i$. In response to these first and second pixel signals, means 310 generates a pixel difference value signal representative of an arithmetic difference between pixel $p_i$ and pixel $c_i$. System 300 further includes vector quantization means 320 for generating a quantized pixel difference value signal in response to the pixel difference value signal provided by means 310. In the preferred embodiment, the quantized pixel difference value signal will represent a vector quantized difference value corresponding to the arithmetic difference between pixel $p_i$ and pixel $c_i$. In addition, to assure that no overflow or underflow conditions occur during the operation of vector dequantization system 200, the absolute value of each quantized difference value selected by vector quantization means 320 is always less than or equal to the absolute value of the arithmetic difference between pixel $p_i$ and pixel $c_i$. Means 330 are provided for forming an encoded (or compressed) digital video signal in response to quantized pixel difference value signals provided by vector quantization means 320. In the preferred embodiment, the vector quantization processing described above is used to encode all pixels in a current image by repeating the process from means 310 for each corresponding pair of pixels ($p_i$, $c_i$) in the current and previous images. During playback, compressed digital video signals generated by means 330 may be applied to systems 100 and 200 to decode and display images stored in the compressed digital video signals.

As set forth in the paragraph immediately above, in the preferred embodiment of the present invention, the preferred vector quantization processing system 300 is used to encode all pixels in a current image by repeating the process from means 310 for each corresponding pair of pixels ($p_i$, $c_i$) in the current and previous images. In an alternate embodiment (not shown), the special vector quantization processing implemented by means 320 (wherein each quantized difference value is always less than or equal to the absolute value of the arithmetic difference between pixel $p_i$ and pixel $c_i$) is only used to encode selected pixels in the current image. According to this alternate embodiment, the encoder initially attempts to encode each pixel using standard vector quantization processing, wherein there is no requirement that the quantized difference value selected by the encoder always be less than or equal to the absolute value of the arithmetic difference between pixel $p_i$ and pixel $c_i$. The encoder then performs a test decompression operation on the current pixel after it has been initially encoded. If, as a result of the test decompression, the encoding system determines that an overflow or an underflow condition would result during decompression if the current pixel were encoded in accordance with the standard vector quantization processing initially used, then the current pixel is encoded again by applying special vector quantization encoding as described by means 320. As described above, this special vector quantization encoding ensures against any overflows or underflows during decoding of the current pixel $c_i$ by requiring the absolute value of each quantized difference value selected to always be less than or equal to the absolute value of the arithmetic difference between pixel $p_i$ and pixel $c_i$.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for forming a decompressed digital video signal representative of a current digital video image, comprising the steps of:

(a) providing a first pixel signal corresponding to a first pixel of a previous digital video image;

(b) providing a second pixel signal corresponding to a second pixel of said previous image;

(c) providing a first quantized pixel difference value signal representing a first quantized pixel difference value between a first pixel of said current image and said first pixel of said previous image;

(d) providing a second quantized pixel difference value signal representing a second quantized pixel difference value between a second pixel of said current image and said second pixel of said previous image;

(e) loading a first value corresponding to said first pixel signal into a first register of a non-parallel processor;

(f) loading a second value corresponding to said second pixel signal into said first register;

(g) loading a third value corresponding to said first quantized pixel difference signal into a second register of said non-parallel processor;

(h) loading a fourth value corresponding to said second quantized pixel difference signal into said second register;

(i) currently generating first and second current pixel values corresponding respectively to said first and second pixels of said current image by adding the contents of said first and second registers in a single operation, wherein said quantized pixel difference values have been predetermined to ensure that the additive result of said second and fourth values does not spillover into the additive result of said first and third values; and (j) generating said decompressed digital video signal in accordance with said first and second current pixel values.

2. The process of claim 1, wherein steps (g) and (h) comprise the step of loading said third and fourth values into said second register in accordance with a single table lookup operation.

3. The process of claim 1, wherein said first and second registers are each 32 bits wide, and wherein four current pixel values are concurrently generated in step (i).

4. An apparatus for forming a decompressed digital video signal representative of a current digital video image, the apparatus comprising:

(a) means for providing a first pixel signal corresponding to a first pixel of a previous digital video image;

(b) means for providing a second pixel signal corresponding to a second pixel of said previous image;

(c) means for providing a first quantized pixel difference value signal representing a first quantized pixel difference value between a first pixel of said current image and said first pixel of said previous image;

(d) means for providing a second quantized pixel difference value signal representing a second quantized pixel difference value between a second pixel of said current image and said second pixel of said previous image;

(e) means for loading a first value corresponding to said first pixel signal into a first register of a non-parallel processor;

(f) means for loading a second value corresponding to said second pixel signal into said first register;

(g) means for loading a third value corresponding to said first quantized pixel difference signal into a second register of said non-parallel processor;

(h) means for loading a fourth value corresponding to said second quantized pixel difference signal into said second register;

(i) means for currently generating first and second current pixel values corresponding respectively to said first and second of said current image by adding the contents of said first and second registers in a single operation, wherein said quantized pixel difference values have been predetermined to ensure that the additive result of said second and fourth values does not spillover into the additive result of said first and third values; and (j) means for generating said decompressed digital video signal in accordance with said first and second current pixel values.

5. The apparatus of claim 4, further comprising means for loading said third and fourth values into said second register in accordance with a single table lookup operation.

6. The apparatus of claim 4, wherein said first and second registers are each 32 bits wide, further comprising means for currently generating four current pixel values.

7. A storage medium encoded with machine-readable computer program code for forming a decompressed digital video signal representative of a current digital video image, comprising:

(a) means for causing a computer to provide a first pixel signal corresponding to a first pixel of a previous digital video image;

(b) means for causing the computer to provide a second pixel signal corresponding to a second pixel of said previous image;

(c) means for causing the computer to provide a first quantized pixel difference value signal representing a first quantized pixel difference value between a first pixel of said current image and said first pixel of said previous image;

(d) means for causing the computer to provide a second quantized pixel difference value signal representing a second quantized pixel difference value between a second pixel of said current image and said second pixel of said previous image;

(e) means for causing the computer to load a first value corresponding to said first pixel signal into a first register of a non-parallel processor;

(f) means for causing the computer to load a second value corresponding to said second pixel signal into said first register;

(g) means for causing the computer to load a third value corresponding to said first quantized pixel difference signal into a second register of said non-parallel processor;

(h) means for causing the computer to load a fourth value corresponding to said second quantized pixel difference signal into said second register;

(i) means for causing the computer to currently generate first and second current pixel values corresponding respectively to said first and second pixels of said current image by adding the contents of said first and second registers in a single operation, wherein said quantized pixel difference values have been predetermined to ensure that the additive result of said second and fourth values does not spillover into the additive result of said first and third values; and (j) means for causing the computer to generate said decompressed digital video signal in accordance with said first and second current pixel values.

8. The storage medium of claim 7, wherein means (g) and (h) comprise means for causing the computer to load said third and fourth values into said second register in accordance with a single table lookup operation.

9. The storage medium of claim 7, wherein said first pixel signal corresponds to a first pixel of a previous image, and said second pixel signal corresponds to a second pixel of said previous image.

* * * * *